Dec. 10, 1968  M. PERLMAN  3,415,281
VALVES
Original Filed April 22, 1963  2 Sheets-Sheet 1
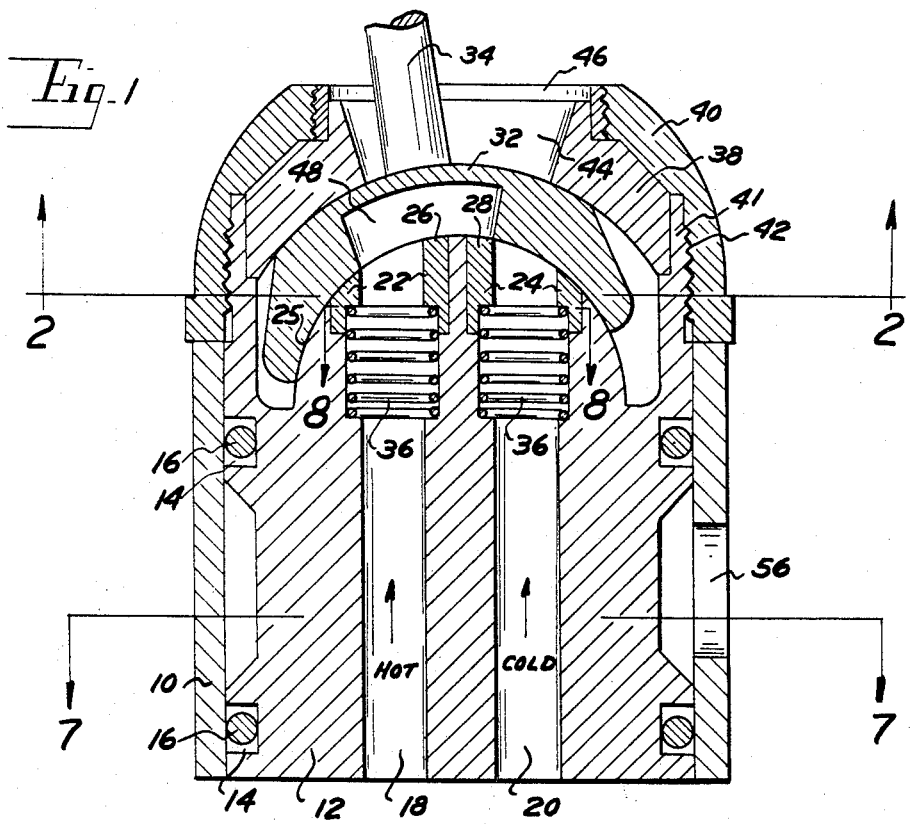
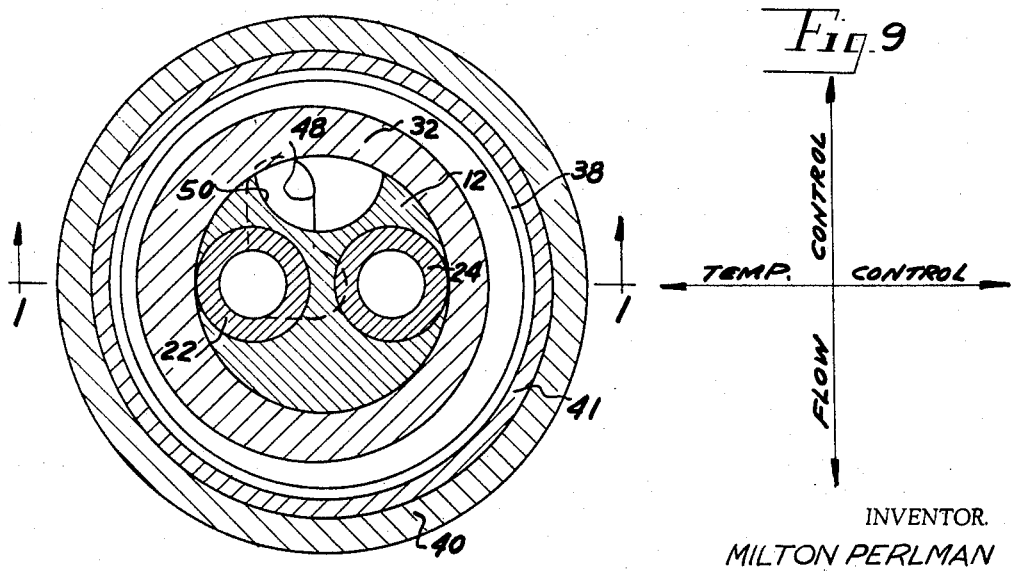
INVENTOR.
MILTON PERLMAN
BY
Cullen, Sloman & Cantor
ATTORNEYS

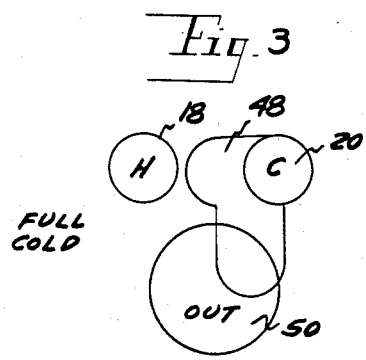
Fig. 3 — FULL COLD
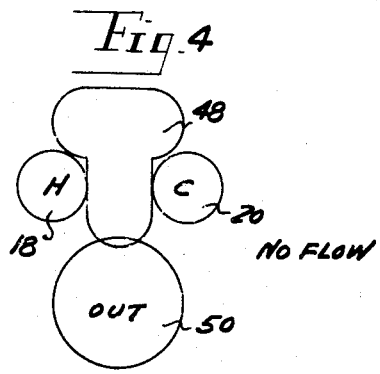
Fig. 4 — NO FLOW
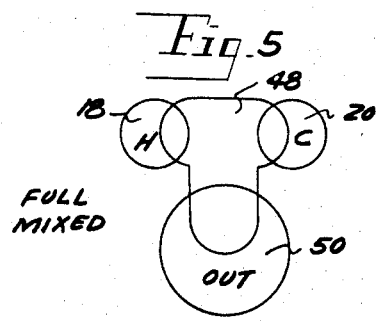
Fig. 5 — FULL MIXED
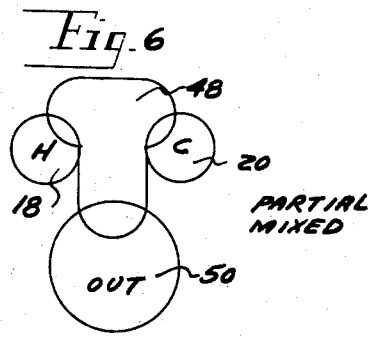
Fig. 6 — PARTIAL MIXED
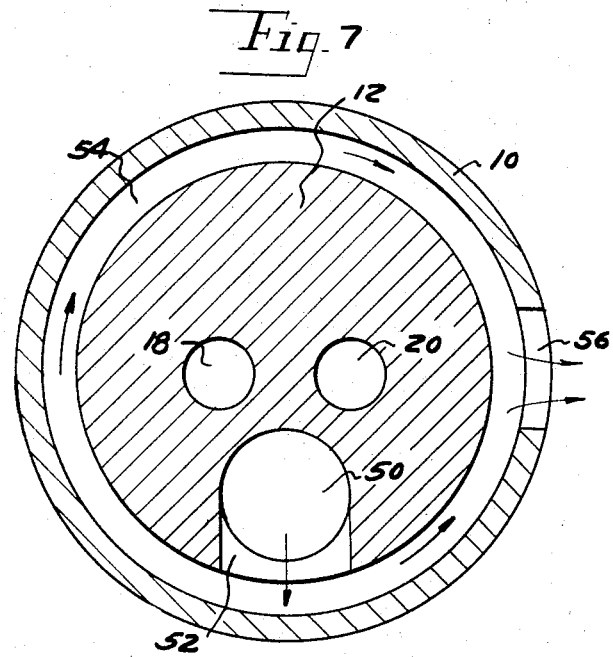
Fig. 7
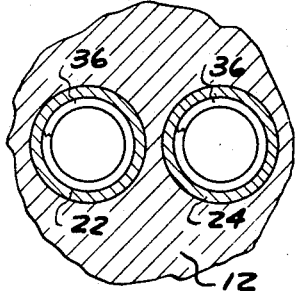
Fig. 8
INVENTOR.
MILTON PERLMAN
BY
Cullen, Sloman, & Cantor
ATTORNEYS United States Patent Office 3,415,281
Patented Dec. 10, 1968

3,415,281
VALVES
Milton Perlman, North Miami, Fla., assignor to Nile Corporation, Royal Oak, Mich., a corporation of Michigan
Continuation of application Ser. No. 274,677, Apr. 22, 1963. This application Aug. 11, 1965, Ser. No. 478,959
9 Claims. (Cl. 137—625.4)

This application is a continuation of my prior application, Ser. No. 274,677 of Apr. 22, 1963.

This application relates to single lever valves or faucets for use in outletting desirable mixtures of hot and cold water as desired, both as to temperature and quantity or volume, all accomplished by the use of a single lever or handle delivery or outletting through a single port or spout.

While valves or faucets of the above class are known, and have been on the market for some while, they have been found objectionable because of their complexity of structure resulting in excessive costs of manufacture and excess burden of assembly and maintenance and installation. In this application I have disclosed an improved form of single lever valve characterized by its extreme simplicity of construction resulting in reduced costs for manufacture and installation and maintenance.

For an understanding of the valve hereof, reference should be had to the appended drawings which disclose a preferred embodiment of such valve.

In these drawings:

FIG. 1 is a diagrammatic elevational section of the preferred valve as if on line 1—1 of FIG. 2.

FIG. 2 is a section view as if on line 2—2, FIG. 1.

FIGS. 3-6 are diagrams illustrating the functioning of the valve.

FIG. 7 is a section vew as if on line 7—7, FIG. 1.

FIG. 8 is a section view as if on line 8—8, FIG. 1.

FIG 9 is a diagram.

The faucet or valve shown diagrammatically comprises a shell 10 of cylindrical form in which is a cylindrical body 12 having narrow external grooves 14 containing sealing rings 16 for sealing the body and shell relatively. Vertical bores 18 and 20, respectively adapted to be connected at their lower ends to HOT and COLD water lines, not shown but indicated, open into and continue as corresponding vertical bores in two separate sealing cylinders 22 and 24 seated in the dome shaped upper end of seat 25 of body 12 and providing ports in such seat 25.

Against seat 25 and the ports provided by the upper, dome-defining, surfaces 26 and 28 of sealing cylinders 22–24, moves laterally, left to right, and transversely, forwards to back, the under surface 30, concave in form, of a control dome or plate or valve member 32 from which upwardly extends an integral stick type lever of direct acting handle 34, operating without mechanical advantage or directional reverse.

Seal back up springs 36 maintain firm tight sealing engagement between surfaces 26–28 and 30, in cooperation with a cap seal plate 38 of dome form and a domed holddown cap 40 threaded onto skirt extension 41 of body 12 at 42. Handle 34 moves left to right, forwards to back, in alined circular openings 44 and 46 of the domed parts 38 and 40.

The under surface of the control dome 32 has a T-shaped mixing valve cavity or chamber 48 whose location determines relative communication among the three bores of body 12. These three bores include the two water inlet bores 18 and 20 mentioned above, and a single vertical outlet bore 50, larger than the inlet bores 18–20, and communicating through a transverse horizontal part of bore 52 with the wide annular external channel or groove 54 of body 12.

Groove 54 communicates with a lateral horizontal outlet or discharge port 56 of shell 10, where may be connected, if desired, an outlet spigot or pipe, not shown, but provided in conventional manner; as are conventional inlet water lines conventionally connected to inlet bores 18–20.

Operation

Lateral movement of integral handle 34 and thus of control plate 32, left-right, on the curved seat, aligns mixing chamber 48 with inlet bores 18–22 and 20–24 in a ratio determined by the departure of chamber 48 from center, to determine the relative proportion of HOT and COLD water admitted into chamber 48.

Transverse movement of handle 34, forward-back, aligns mixing chamber 48 with more or less of the upper end of outlet bore 50 to determine the amount of outlet opening exposed and the volume of water outletted through bores 50–52, groove 54, and outlet port 56.

The single handle 34 and control plate 32, together, without reverse of direction of movement between them, and without mechanical advantage may be moved in any radial direction from center, laterally, transversely, or laterally-transversely, to determine the relative proportion of hot and cold water admitted to mixing chamber 48 and as well and simultaneously the volume of water outletted from such chamber and the faucet as a whole.

Since handle 34 may be moved forward and back at any point in its left-right Hot-Cold path defined by and connecting inlet bores 22–24, it may be shifted to OFF for full closing in any desired temperature setting. This provides a temperature preset, enabling the valve to be turned ON, in any volume, at a preset temperature, so important in shower valves.

Since seat 25 is convex, sediment will not lodge on it, but will wash off.

Since the temperature path, connecting and defined by bores 22–24 is straight, a firm guided "feel" of movement of handle 34 is given to the hand of the user.

Now having described the single lever valve of preferred form disclosed in the appended drawings, reference should now be had to the claims which follow.

I claim:
1. A valve including in combination:
    a body having three generally parallel bores opening to its upper end;
    and a control plate for closing or opening the upper ends of said three bores, and, thus, being movable across such upper ends;
    said control plate being a large area plate of considerable thickness and having in its lower surface a generally T-shaped shallow large area mixing cavity, or chamber, movable with the control plate and open for its full extent to the lower surface of the plate, to communicate desired areas of the two inlet bore upper ends with a desired area of the outlet bore upper end and to control mixture of water inletted into said mixing chamber and, also, the volume of water outletted from said mixing chamber;
    and means for desirably moving the control plate across the upper ends of the bores;
    the upper end of the body being convexly domed and the lower surface of the control plate, engaging the body, being complementarily concave.

2. A valve according to claim 1, with said valve also having a domed holddown cap threaded on the body and overlying the control plate and firmly bearing on it;
    resilient sealing means between said plate and said cap and also between said plate and the upper ends of the inlet bores;
    such cap by being firmly threaded on the body and bearing firmly on the plate, functioning to maintain adequate sealing pressures in the valve and at the same time creating substantial friction between the movable plate and the stationary body and sealing means.

3. A valve including in combination:

a body having three generally parallel bores opening to its upper end;

and a control plate for closing or opening the upper ends of said three bores, and, thus, being movable across such upper ends;

two of said bores being inlet bores for hot and cold water respectively;

the third bore being an outlet bore for a mixture of hot and cold water determined as to volume and mixture by the position of the control plate relative to the upper ends of the three bores;

said control plate being a large area plate formed with means for communicating the upper ends of the two inlet bores with the upper end of the outlet bore;

said plate being a generally saucer like disk which is relatively thin with respect to its diameter;

and means for desirably moving the control plate across the upper ends of the bores;

the upper end of the body being convexly domed and the lower surface of the control plate, engaging the body, being complementarily concave.

4. A valve according to claim 3, with said valve also having a domed holddown cap threaded on the body and overlying the control plate and firmly bearing on it;

resilient sealing means between said plate and said cap and also between said plate and the upper end of the inlet bores;

such cap by being firmly threaded on the body and bearing firmly on the plate, functioning to maintain adequate sealing pressures in the valve and at the same time creating substantial friction between the movable plate and the stationary body and sealing means.

5. A valve according to claim 4 having a direct acting handle in the form of an integral lever of small diameter projecting upwardly from the control plate through a hole in said cap to be exposed for direct manipulation without direction reverse or mechanical advantage.

6. A valve according to claim 3 wherein said means comprises a T shaped cavity in the under surface of said plate.

7. A valve according to claim 4 wherein said means comprises a T shaped cavity in the under surface of said plate.

8. A valve including in combination:

a body having three generally parallel bores opening to its upper end;

and a control plate for closing or opening the upper ends of said three bores, and, thus, being movable across such upper ends;

two of said bores being inlet bores for hot and cold water respectively;

the third bore being an outlet bore for a mixture of hot and cold water, determined as to volume and mixture by the position of the control plate relative to the upper ends of the three bores;

said control plate being a large area plate formed with means for communicating the upper ends of the two inlet bores with the upper end of the outlet bore;

said plate being a generally saucer like disk which is relatively thin with respect to its diameter;

and means for desirably moving the control plate across the upper ends of the bores;

the upper end of the body being convexly domed and the lower surface of the control plate, engaging the body, being complementarily concave;

said valve also having a domed holddown cap threaded on the body and overlying the control plate and firmly bearing on it;

resilient sealing means between said plate and said cap and also between said plate and the upper end of the inlet bores;

such cap by being firmly threaded on the body and bearing firmly on the plate, functioning to maintain adequate sealing pressures in the valve and at the same time creating substantial friction between the movable plate and the stationary body and sealing means;

said valve also having a direct acting handle in the form of an integral lever of small diameter projecting upwardly from the control plate through a hole in said cap to be exposed for manipulation without mechanical advantage or direction reverse.

9. A valve according to claim 8 wherein said means comprises a T-shaped cavity in the under surface of said plate.

References Cited

UNITED STATES PATENTS

| | | | |
|---|---|---|---|
| 2,090,165 | 8/1937 | Werner | 137—625.41 X |
| 2,448,649 | 9/1948 | Adams et al. | 137—625.42 X |
| 3,035,612 | 5/1962 | Lyon | 137—625.4 X |
| 3,056,418 | 10/1962 | Adams et al. | 251—315 X |

M. CARY NELSON, *Primary Examiner.*

M. O. STURM, *Assistant Examiner.*